(12) United States Patent
Pierson

(10) Patent No.: US 6,888,558 B2
(45) Date of Patent: May 3, 2005

(54) LASER-INDUCED THERMAL IMAGING WITH MASKING

(75) Inventor: Dallas K. Pierson, Oakdale, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 89 days.

(21) Appl. No.: 10/028,548

(22) Filed: Dec. 19, 2001

(65) Prior Publication Data

US 2003/0112321 A1 Jun. 19, 2003

(51) Int. Cl.$^7$ .................................................. B41J 2/47
(52) U.S. Cl. ...................................... 347/240; 347/251
(58) Field of Search .............................. 347/9, 15, 10, 347/240, 251, 233, 254, 237, 247; 318/685; 358/1.8, 3.06, 3.13, 3.17, 3.18, 3.19

(56) References Cited

U.S. PATENT DOCUMENTS

| | | | |
|---|---|---|---|
| 4,900,130 A | 2/1990 | Haas | 359/198 |
| 5,164,742 A | 11/1992 | Baek et al. | 347/234 |
| 5,183,798 A | 2/1993 | Sarraf et al. | 503/227 |
| 5,329,297 A | 7/1994 | Sanger et al. | 347/251 |
| 5,555,006 A | 9/1996 | Cleveland et al. | 347/41 |
| 5,602,572 A | 2/1997 | Rylander | 358/3.09 |
| 5,677,714 A * | 10/1997 | Klassen et al. | 347/9 |
| 5,724,086 A | 3/1998 | Mackin et al. | 347/237 |
| 5,808,655 A | 9/1998 | Haas et al. | 347/234 |
| 5,818,498 A | 10/1998 | Richardson et al. | 347/237 |
| 5,831,659 A | 11/1998 | Baek et al. | 347/238 |
| 5,935,758 A | 8/1999 | Patel et al. | 430/200 |
| 5,992,962 A | 11/1999 | Yen et al. | 347/9 |
| 6,001,530 A | 12/1999 | Kidnie et al. | 430/201 |
| 6,064,170 A * | 5/2000 | Spurr et al. | 318/685 |
| 6,067,405 A * | 5/2000 | Serra | 358/1.8 |
| 6,109,454 A | 8/2000 | Stangebye-Hansen | 211/40 |
| 6,171,766 B1 | 1/2001 | Patel et al. | 430/339 |
| 6,179,407 B1 | 1/2001 | Bockman | 347/40 |
| 6,183,055 B1 * | 2/2001 | Kanematsu et al. | 347/9 |
| 6,493,112 B1 * | 12/2002 | Arce et al. | 358/3.19 |
| 6,659,580 B2 | 12/2003 | Horikoshi | 347/9 |

FOREIGN PATENT DOCUMENTS

| | | |
|---|---|---|
| EP | 0 718 105 A1 | 6/1996 |
| EP | 0 738 068 | 10/1996 |
| EP | 0 946 043 | 9/1999 |

OTHER PUBLICATIONS

Galbart, "High Power Multi-Channel Writing Heads," IS&T's 47 Annual Conference/ICPS, Creo Products Inc., pp. 608–611, 1994.

* cited by examiner

Primary Examiner—Hai Pham
(74) Attorney, Agent, or Firm—Shumaker & Sieffert, PA

(57) ABSTRACT

The invention is directed to techniques for compensating for imaging aberrations that result from repeated passes by an imaging laser array. The techniques provide for printing overlapping swaths and providing masking for at least one printing pass. The masks generally expand and contract the breadth of the printing swath.

36 Claims, 6 Drawing Sheets

LASER-INDUCED THERMAL IMAGING WITH MASKING

TECHNICAL FIELD

The invention relates to imaging, and more particularly to laser-induced thermal imaging.

BACKGROUND

An image may be encoded into image data, which may be transmitted, stored, processed, or otherwise manipulated electronically. The image may be decoded and converted to hard copy by sending the image data to a printer. Laser thermal printers, with their high resolution capability, provide a popular mode for producing hard copy images from digital image data.

Laser thermal printers may be used with a variety of imaging media or "receptors," including many kinds of film and paper. In a typical laser imager, a receptor is placed very close to a color-coated substrate or "donor" sheet, and one or more laser beams are directed at the donor. Each laser may emit an infrared beam, and the colored coating, which may contain a colorant and/or an infrared-sensitive dye, heats when exposed to a beam of sufficient power. The resulting thermal energy induced by the lasers triggers the imaging process, causing colorant to transfer from the donor to the receptor.

The lasers are typically arranged in a linear array, with each laser in the array individually modulated by image data. The array may include any number of lasers, although an array of sixteen lasers is typical. Semiconductor or "diode" lasers are commonly used in an array for reasons of cost, convenience and reliability. The lasers may, for example, emit infrared beams with wavelengths of approximately 830 nm. The breadth of the array, which is a function of the spacing of the lasers, is usually adjustable.

The image data that modulate the lasers represent the shape, size and density of the image. Image data are routinely stored electronically, and are provided to the array in the form of a plurality of signals, typically one signal for each laser. Although the lasers in the array strike only a small portion of the donor and receptor at any one time, the array can print large regions by scanning across the donor and receptor. As the array scans the donor and receptor, each laser in the array emits a beam in response to an image signal. In most cases, the laser array may make several successive parallel or helical passes to generate the complete image. Each pass of the array prints a strip or "swath" on the receptor. To avoid the appearance of white lines in the receptor, i.e., unprinted spaces between swaths, successive swaths may abut or overlap preceding swaths.

When a beam sufficiently heats the donor, a spot of colorant is transferred from the donor to the receptor. By modulating the duration for which a laser beam strikes an area on the donor, modulating a laser's intensity and/or modulating the size of the beam, spots of colorant of different sizes may be formed, and thereby colors may appear darker or fainter in color. Often a region of the receptor is intended to receive no colorant from the donor, and when scanning that region, a laser emits no beam, or emits a beam at a power level below that needed to transfer colorant.

The receptor may be scanned multiple times using donors of different colorants, creating a multicolor image by the superposition of multiple monochromatic images. By repeating scans with donors coated with cyan, yellow, magenta and black, for example, a multicolor image may be formed on the receptor. For high fidelity printing systems, additional colors such as green and orange may be provided.

Ideally, an observer ought to be able to look at a printed image and see no indications that the image had been formed by repeated passes of a laser array. In some cases, however, unintended patterns, such as groups of lines or streaks, appear in the printed image. These imaging aberrations, also called "artifacts," may be evident in halftone printing, when printing a single color and when overprinting multiple colors.

At least two factors contribute to these artifacts. One factor is the formation of "swath lines," which may manifest at an edge of a laser swath in the form of heavier colorant depositions. Swath lines may result from the deposition of excess colorant along an edge of the swath, causing a heavier line of colorant than intended and causing the swath to have a non-uniform distribution. Swath lines may also result from a deficit of colorant. The end lasers in the array, i.e., the outermost lasers in the array, have one neighbor laser instead of two neighbor lasers. As a result, the lines on the edge of the scan may receive less thermal energy, causing less transfer of colorant.

Ruling and screen angle can also contribute to the artifacts. In halftone printing, printed images are formed from halftone dots, with the halftone dots varying in size according to the lightness or darkness of the image. The halftone dots are printed by the lasers, but the halftone dots are generally much bigger than the laser beams. Each laser prints in units of "pixels," and usually a matrix of several pixels is required to make up a single halftone dot. Consequently, it may take several lasers in the array to print a single halftone dot. Halftone dots are printed at a defined ruling, i.e., a number of halftone dots per unit of length, and at a defined screen angle, i.e., an angle at which the rows of halftone dots are oriented.

In standard four-color printing, each color is printed using approximately the same ruling, but each color is "screened" at a different angle to prevent halftone dots of different colors from printing one on top of the other and obscuring each other. Screening colors at different angles also avoids generation of an objectionable moiré pattern between the color layers.

When the spatial frequency of the swath lines and the spatial frequency of the halftone dots are close to one another but not equal, a moiré pattern may form. In other words, two small superimposed patterns of similar spatial frequency may combine visually to form a larger and more prominent moiré pattern. The moiré pattern usually resembles spurious light and/or dark bands in the image, and is generally considered to be an undesirable aberration of the image. The phenomenon may also be described as "beating," because it results from superposition of patterns close to each other in spatial frequency. In a multicolor image, a plurality of screen angles come into play, and beating may occur in one or more colors, resulting in superimposed moiré patterns.

Stochastic printing is an alternative to halftone printing, in which color density is related to the spatial density of pixels printed by lasers. Moiré patterns tend not to form with stochastic printing because stochastic printing does not employ rulings and screen angles. In stochastic printing, however, swath lines may generate undesirable banding artifacts.

To reduce the artifacts described above, techniques may be employed to break up and/or reduce the swath lines, thereby reducing banding. In general, the techniques provide for overlapping swaths and providing masking for one or both passes that print the overlapped region. In general, a mask is a set of logical '0' values and logical '1' values. The lasers in the array are individually modulated as a function of the image data and the mask. Depending upon whether a value is a logical '0' value or a logical '1' value, a laser in the imaging array is either enabled or deactivated. In this way, masking involves printing a fraction of the pixels.

Some masking techniques, while reducing some banding artifacts, may introduce new banding artifacts. In particular, each laser in the array, when printing, derives some benefit from the heat generated by its neighbor lasers. An end laser, which has only a single adjacent neighbor laser, derives less thermal benefit than other lasers and consequently may print lower density pixels. As a result, the line width of an end laser may be narrower than the line width of other lasers, which can lead to banding. Another potential source of banding is too much transfer of colorant caused by overlapping swaths. The banding artifacts are especially evident along the edges of the swath.

SUMMARY

The invention is directed to masking techniques that compensate for artifacts that result from repeated passes by an imaging laser array, while reducing artifacts that may be introduced by masking. The invention is particularly useful in a thermal imaging system that makes use of a laser array. The masking techniques take advantage of the thermal benefit of neighboring lasers, thereby avoiding line narrowing. The masking techniques further break up swath lines to reduce or eliminate banding artifacts.

The techniques generally provide for creation of a mask. The image data are printed with the mask, and then the same data are printed a second time, without a mask. As a result, the breadth of the swath printed by the lasers varies. The breadth of the swath expands and contracts. The expansions and contractions, however, are irregular.

A technique for achieving this result is to generate a mask comprising one or more subset masks. Each subset mask includes sets of logical values spatially arranged in irregular triangle-like shapes or clusters. As the lasers in the array are modulated by image data and the triangle-like clusters, the lasers print a swath of varying breadth.

In one embodiment, the invention presents a mask for a laser thermal printer. The mask includes two sets of first logical values, such as logical '0' values, and a set of second logical values, such as logical '1' values. The sets of the first logical values are spatially clustered in triangle-like shapes. The set of second logical values may also be spatially clustered in a triangle-like shape, typically with an inverted orientation.

In another embodiment, the invention presents a mask for a laser thermal printer that comprises at least two subset masks. Each subset mask comprises two sets of first logical values and a set of second logical values. The sets of logical values are spatially clustered in triangle-like shapes.

In a further embodiment, the invention presents a mask for a laser thermal printer that comprises at least two subset masks. Each subset mask comprises a set of first logical values and a set of second logical values. The sets of first logical values are spatially clustered in triangle-like shapes, with the subset masks having different triangle-like clusters.

In an additional embodiment, the invention presents a method for printing with a laser thermal printing system. The method includes printing a swath on a thermally sensitive medium as a function of a set of data and varying the breadth of the swath during printing. Varying the breadth of the swath may comprise irregularly contracting the breadth of the swath and irregularly expanding the breadth of the swath.

In another embodiment, the invention presents a method comprising generating a first set of first logical values in a first triangle-like shape, generating a second set of first logical values in a second triangle-like shape and generating a mask for a laser thermal printer comprising a set of second logical values, the first set of first logical values in the first triangle-like shape and the second set of first logical values in the second triangle-like shape.

In an additional embodiment, the invention presents a method for generating a mask from subset masks. The method includes generating two subset masks, each subset mask with a set of first logical values and a set of second logical values. The method also includes assembling a mask for a laser thermal printer from the subset masks.

In a further embodiment, the invention presents a system that includes a thermally sensitive color donor including colorant, a receptor positioned to receive colorant from the donor, a controller and a set of lasers. The lasers receive a signal from the controller and emitting a beam directed at the donor as a function of the signal. The beams form a swath having a breadth, and the controller varies the breadth of the swath during printing. The controller may vary the breadth of the swath as a function of a mask.

The invention may provide one or more advantages, including reducing artifacts that may result from swath lines. At the same time, the invention reduces artifacts that may result from patterns in masks. In addition, the invention takes advantage of the thermal benefits provided by adjacent lasers. Each of these advantages enhances the quality of the printed image.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
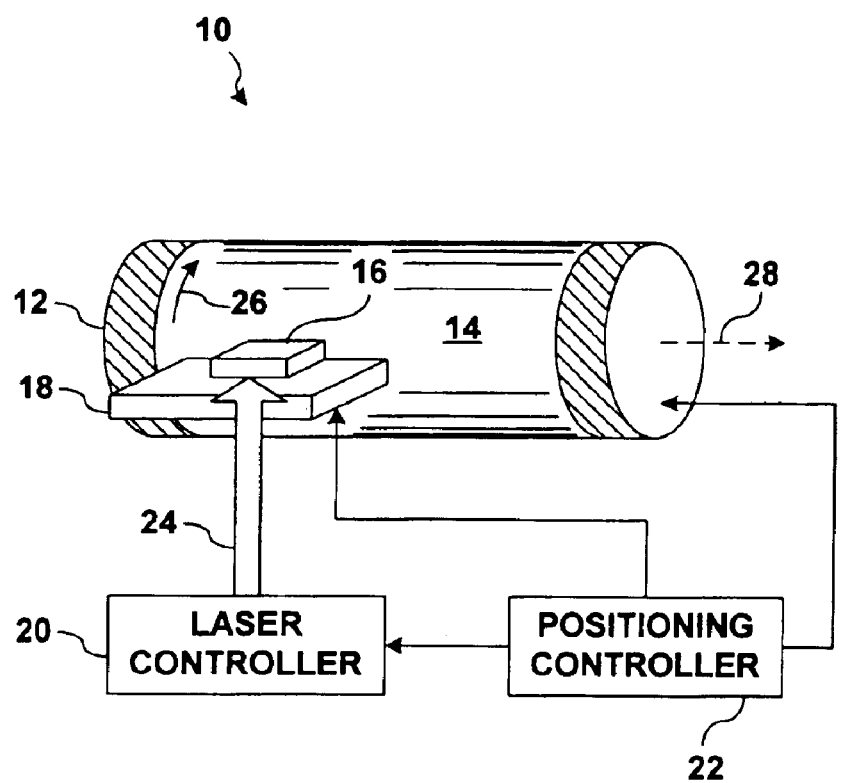
FIG. 1 is a diagram of a laser imaging system.

FIG. 1 shows a typical laser thermal imaging system 10. Mounted to rotating drum 12 is a receptor (not shown in FIG. 1), such as film or paper. Donor 14 is mounted on the drum over the receptor. As drum 12 rotates under the control of positioning controller 22, donor 14 and the receptor rotate together. The direction of rotation 26 of drum 12 is called the "fast scan direction." System 10 can be configured, in accordance with the invention, to print in a swath that expands and contracts.

Writing head 16, which includes an array of lasers, is coupled to optical head platform 18, which positions writing head 16 with respect to drum 12. Optical head platform 18 can move laterally with respect to drum 12. The direction in which optical head platform 18 can move is the same direction 28 as the axis of rotation of drum 12, and is called the "slow scan direction." Writing head 16 may print parallel swaths in fast scan direction 26 or slow scan direction 28, but usually writing head 16 prints swaths helically by printing in fast scan direction 26 and slow scan direction 28 simultaneously.

Positioning controller 22 regulates the rotational speed of drum 12 and the position of optical head platform 18. By rotating drum 12 and/or moving optical head platform 18, positioning controller 22 can bring one or more lasers to bear upon substantially any point on the surface of donor 14.

Lasers in writing head 16 are under the control of laser controller 20, and are modulated by image data 24 supplied to laser controller 20. Positioning controller 22 typically sends a timing signal to laser controller 20 so that the correct image data will be supplied to the lasers when the laser array is in the correct position relative to donor 14. Laser controller 20 may be, for example, a computer such as a personal computer, a microcomputer or an embedded processor or microcontroller.

As will be described in more detail below, lasers in writing head 16 may be modulated not only by image data 24, but also by a logical mask that reduces the presence of printing artifacts. A logical mask is a set of logical values in the form of a matrix of logical '0' values and logical '1' values. Each logical value corresponds spatially to a pixel on the receptor. Laser controller 20 combines the image data for a pixel by a logical AND operation with the mask logical value corresponding to the pixel.

Masked image data, i.e., image data combined with a logical mask, may include some data that are printed normally and some data that are not printed. When the value in the mask corresponding to a pixel is a logical '1,' the laser is enabled and the pixel is printed normally. When the value in the mask corresponding to a pixel is a logical '0,' the laser is disabled and the pixel is not printed.

Figure 2:
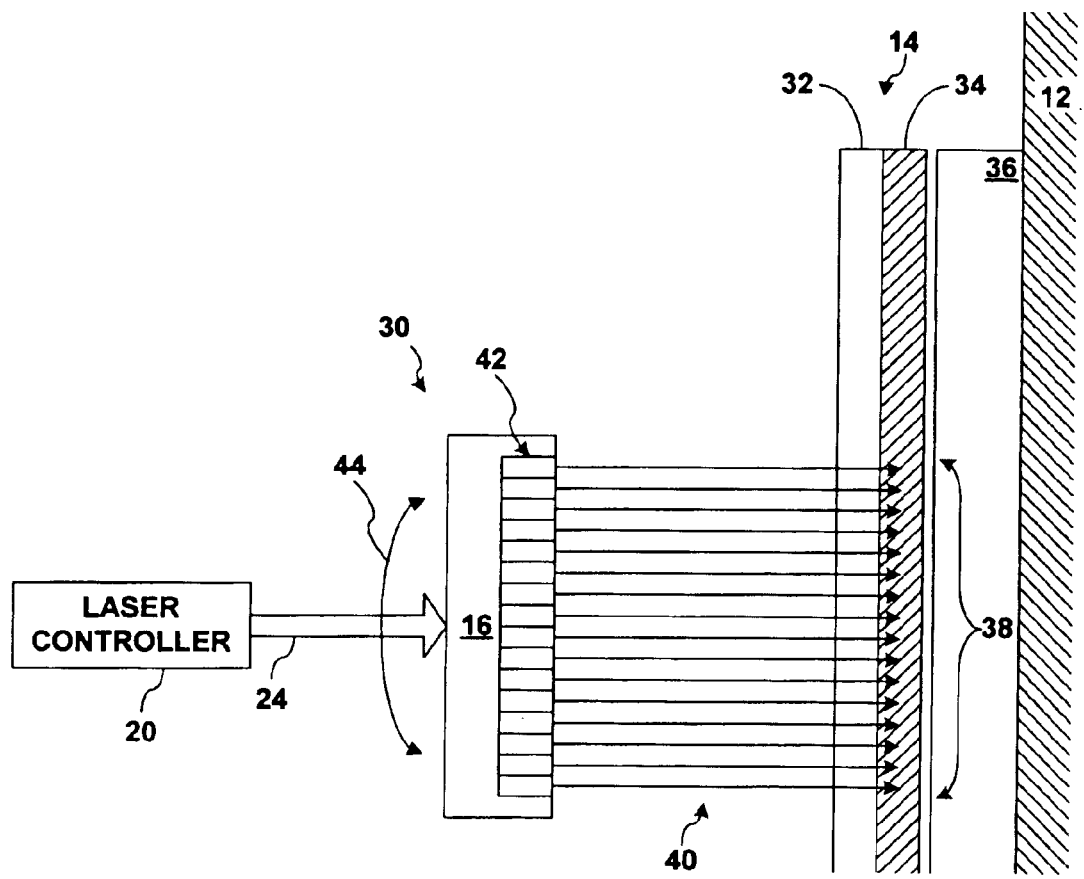
FIG. 2 is a diagram of an array of lasers with a donor and receptor.

FIG. 2 depicts a laser thermal imaging process. Writing head 16 comprises an array 42 of sixteen lasers. Each laser in array 42 is separately controlled by laser controller 20. Although sixteen individual laser beams 40 may be emitted from array 42 as shown in FIG. 2, the invention may be used with thermal imaging arrays having more or fewer individual lasers. Beams 40 strike substrate 32 of donor 14, heating colored coating 34. Substrate 32 and/or colored coating 34 may be selected to absorb the wavelength of radiation emitted by the lasers. Heating causes colorant to transfer from donor 14 onto receptor 36.

The surface of receptor 36 may be, in effect, divided into small picture elements or pixels. A single laser can generate a spot of colorant, sometimes called a "laser dot," at one pixel on receptor 36. The path taken by a laser beam as it scans across donor 14 is called a "line," each line including one or more pixels. Each laser may or may not print one or more laser dots along the line that it scans, depending upon the modulating signal received from laser controller 20.

The total of the lines printed by laser beams 40 make up swath 38. The breadth of swath 38 may be varied by rotating array 42 about an axis perpendicular to the surface of drum 12, as indicated by reference numeral 44, allowing printing at different resolutions. The breadth of swath 38 may be also be varied by controlling the number of laser beams 40 that strike substrate 32 of donor 14.

As described above, a typical halftone dot is larger than a pixel or a line, so it may take several lasers to print a single halftone dot. Also as described above, swath lines tend to form along an edge of swath 38. The spatial frequency of the swath lines, in conjunction with the spatial frequency of colored regions due to ruling and screen angle, may generate an undesirable moiré pattern.

The technique provides for printing each line twice, using two passes per line. In a first pass, the line is printed according to the image data delivered to laser controller 20 for modulation of the laser that prints the line, and according to a logical mask, which will be described in more detail below. In an overlapping pass, the line is printed normally, according to the image data without a logical mask.

In some kinds of laser thermal imaging, printing part of an image twice generally does not result in an excess of colorant or other noticeable aberration of the image, as long as the thermal energy received by the donor is not too high. If the thermal energy is too high, then excess colorant may transfer to the receptor, resulting in banding. Printing part of each swath with a mask, as described below, helps keep thermal energy within reasonable bounds. Printing part of each swath with a mask can also significantly reduce the appearance of swath lines, reduce banding, disrupt the moiré pattern and improve the visual appearance of the resulting image.

Figure 3:
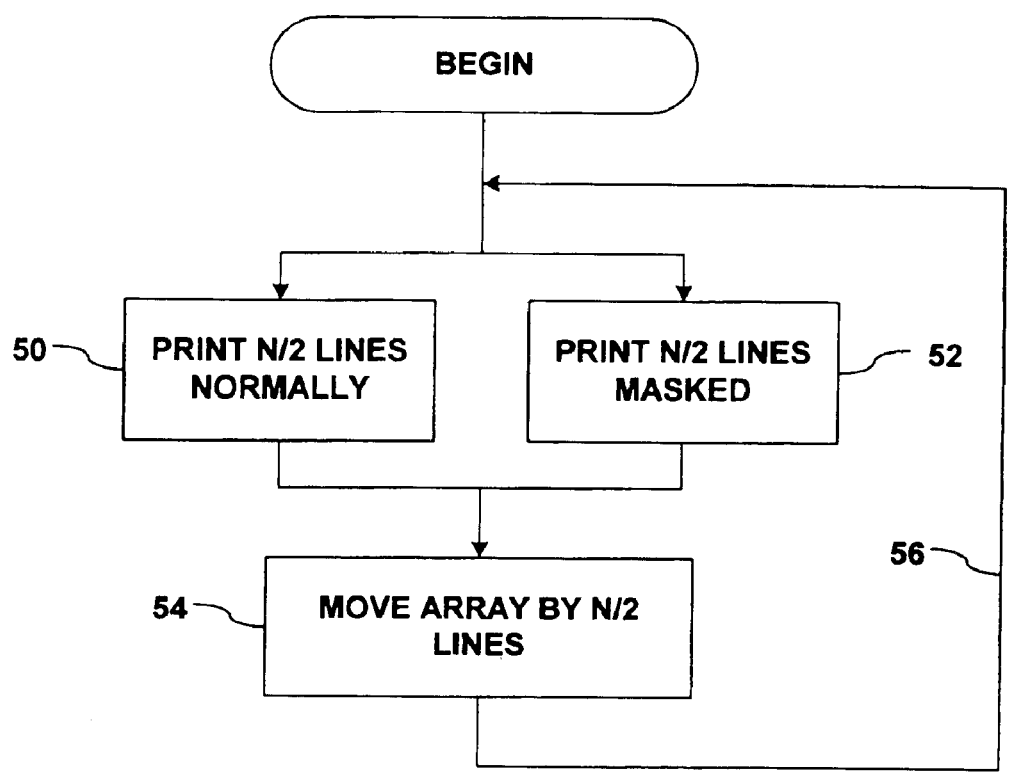
FIG. 3 is flow diagram illustrating a technique for printing with and without a mask.

FIG. 3 is a flow diagram showing an exemplary technique by which banding may be substantially reduced. The technique assumes that there are N lasers in the array, and that N is an even number, such as sixteen. This assumption is for purposes of illustration, and the invention is not limited to arrays having an even number of lasers. The lasers in the array may be identified by number, from 1 to N.

The technique provides for printing each line twice, using two passes per line. When printing a typical swath, half of the lines are printed normally (50), i.e., N/2 contiguous lasers in the array print the lines modulated as a function of the image data but not as a function of a mask. The other half are printed in a masked form (52), i.e., other N/2 contiguous lasers in the array print the remainder of the swath as a function of the image data and a mask. Optical head platform 18 moves the laser array by N/2 lines (54) and the printing process may be repeated (56).

When the printing is completed, the full image has been printed. Every line has been fully printed and no image data have been discarded. Some image data, however, have been printed twice.

The technique shown in FIG. 3 is exemplary, and the invention is not limited to this technique. The number of lines printed normally need not be the same as the number of lines printed in masked form. Other divisions of unmasked and masked lasers are possible. In an array of sixteen lasers, for example, nine lasers may print normally, while seven lasers may print in masked form.

Figure 4:
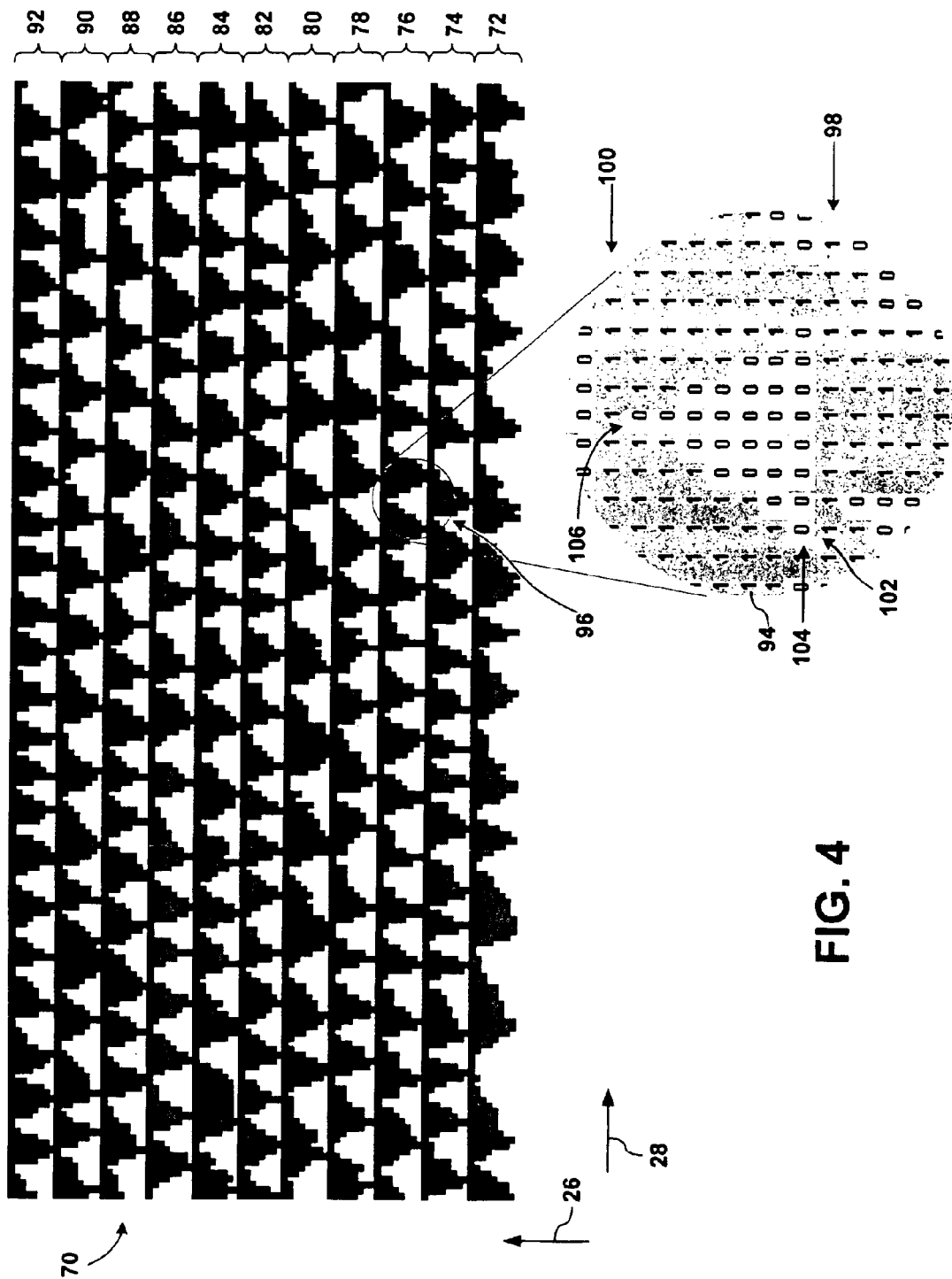
FIG. 4 is a diagram of an exemplary mask, including subset masks.

FIG. 4 shows an exemplary mask 70. Mask 70 is a set of logical values in the form of a matrix of logical '0' values, depicted as light spaces, and logical '1' values, depicted as dark spaces. Each logical value corresponds spatially to a pixel on the receptor. Arrow 26 identifies the fast scan direction and arrow 28 identifies the slow scan direction. Mask 70 may be stored in a computer-readable data file in the memory of laser controller 20 or anywhere in the data handling path.

A mask may be of any size, but typical mask dimensions are 64-by-32 or greater. Exemplary mask 70 has dimensions greater than 64-by-32. Mask 70 can be replicated by tiling in fast scan direction 26 and slow scan direction 28, and can thereby be expanded to cover a printing surface of arbitrary size.

A single mask may support several swaths. In fast scan direction 26, the dimension of mask 70 is evenly divisible by eight. When used with an array of sixteen lasers according to the technique shown in FIG. 3, eight lasers are printed masked. Accordingly, mask 70 includes a plurality of subset masks 72, 74, 76, 78, 80, 82, 84, 86, 88, 90, 92. Each subset mask is eight logical values wide. When printing sixteen-line swaths with eight lines of overlap, for example, image data may be masked by mask subset 92 in a first swath and image data may be masked by mask subset 90 in a second swath, and so on. By tiling mask 70 in fast scan direction 26, subset mask 92 may be used after subset mask 72. Using a variety of subset masks breaks up swath lines more effectively than simply using a single smaller mask over and over.

In mask 70, every subset mask includes a row of logical '1' values. This feature is shown in exemplary region 94, which is region 96 enlarged for clarity. Exemplary region 94 shows rows 98 and 100 comprising only logical '1' values. The rows of logical '1' values improve the quality of printing.

The quality of laser thermal imaging depends upon the heat produced by a laser. Each laser in a laser thermal imaging array, when printing, derives some benefit from the heat generated by its neighbor lasers. As a result, printing by several adjacent lasers is more energy efficient than printing by an equal number of isolated lasers. An end laser, such as the laser that prints the first line, has only a single adjacent neighbor laser. Because the end laser has only one neighbor, the end laser does not derive as much thermal benefit and consequently tends to print lower density pixels. If this end laser were to print a line without overlapping, the line may be more narrow than lines printed by other lasers.

Accordingly, the line printed by this end laser is, in effect, printed twice in its entirety. The line is first printed by a laser in the middle of the array. In an array of sixteen lasers, the line may be printed by the ninth laser. The line printed by the ninth laser is printed masked, but because the mask for that line consists entirely of logical '1' values, in effect the line is printed as an unmasked line. Following movement of the laser array by eight lines (54), the same line is overprinted by the first laser in the array. If the first laser were to print the line without overlapping the previously printed line, the line may be more narrow than lines printed by other lasers.

In other words, the first laser in the array overlaps data already printed by the ninth laser. The first laser therefore does not print any data missed by the ninth laser. The first laser serves an important function, however, by providing heat for its neighbor laser, i.e., the laser that prints the second line. As a result, the laser that prints the second line prints more efficiently.

The presence of rows of logical '1' values in mask 70 is merely an exemplary embodiment of the invention. The invention does not require rows of logical '1' values. An equivalent result may be obtained by using a mask with subset masks that are seven logical values wide and no rows of logical '1' values. The equivalent result may be obtained by printing normally with nine lasers and printing in masked form with seven lasers.

Another feature of mask 70 is that groups of logical '0' values and logical '1' values are spatially clustered as triangle-like shapes. Cluster 102 in exemplary region 94 is an example of a triangle-like cluster of logical '0' values. The clusters in mask 70 are not strictly triangular clusters.

Some clusters may be described, for example, as semicircular clusters or sinusoidal clusters or trapezoidal clusters or pentagonal clusters. The term "triangle-like" encompasses all of these shapes. The lack of regularity of the shapes of the clusters, and the fact that the clusters are not strictly triangular, are advantages of the invention. In particular, lack of regularity helps break up or disrupt patterns in the printed image, resulting in fewer artifacts and a more pleasing image. In other words, the lack of uniformity of the triangle-like clusters disrupts the spatial frequency of the swath lines, reducing the risk of generating artifacts such as a moiré pattern or banding.

Exemplary cluster of logical '0' values 102 includes a base 104 and a single peak 106. Triangle-like clusters of logical '1' values also include a base and at least one peak, but are inverted in comparison to the triangle-like clusters of logical '0' values. Some triangle-like clusters in mask 70 include more than one peak. The bases of the triangle-like clusters are oriented in slow scan direction 28. Notably, the peaks of the triangle-like clusters are unaligned in fast scan direction 26, although some peaks in some subset masks may be aligned by chance.

Subset masks 72–92 are included in mask 70 by arranging subset masks 72–92 spatially proximal to each other in fast scan direction 26. Consequently, peak 106 of exemplary triangle-like cluster 102 is spatially proximal to the base of one or more triangle-like clusters in subset mask 78.

When a swath is printed with any of subset masks 72–92, the swath boundary zigzags. As a result, the breadth of the swath generally expands and contracts during printing. In a sixteen-laser array, for example, all sixteen lasers print lines at one point, thereby printing the full breadth of a swath. As the printing proceeds, however, the breadth of the swath contracts. For example, the contraction may reduce the number of active lasers to fourteen, such that the breadth of the swath is fourteen lines. The breadth of the swath may contract again to thirteen lines, then twelve, then ten, then nine, then eleven, then twelve, then thirteen, then thirteen again, then fifteen, then back to sixteen.

The contraction and expansion of the swath are irregular, due to irregular triangle-like clusters in mask 70. The expansion of the breadth of a swath is not necessarily a reversal of the sequence of the contraction. In the following cycle of contraction and expansion, the contraction and expansion is unlikely to occur in exactly the same way as on the previous cycle. The irregularity helps break up swath line patterns in the printed image and does not introduce new patterns into the image.

The boundary between logical '1' values and logical '0' values in each of subset masks 72–92 resembles a zigzag or triangular wave, with the regions of and logical '0' values tending to expand, then contract, while the regions of logical '1' values contract, then expand. The zigzag is irregular, however, in three respects.

First, the spatial frequency of the zigzag varies from subset mask to subset mask, resulting in bases of different sizes. The spatial frequency of triangle-like clusters in subset mask 92, for example, is greater than the spatial frequency in subset mask 80. In addition, the spatial frequency is inconsistent within a single subset mask, resulting in triangle-like clusters with differently sized bases in the subset masks. The spatial frequency of the zigzag in a subset mask may be, but is not required to be, greater than the spatial frequency of the halftone dots that make up the printed image. When writing head 16 prints swaths in fast scan direction 26, a high spatial frequency reduces the likelihood that the zigzag of the boundary will intersect neighboring halftone dots in a periodic fashion.

Second, the phase of the zigzag varies from subset mask to subset mask. In other words, the bases and peaks of the triangle-like clusters in subset masks 72–92 are not aligned.

Third, the zigzag is not regular or symmetric. Rather, the sides of the triangle-like clusters tend to be irregular, rather than straight lines. The irregularity is randomly introduced.

An exemplary technique for generating a subset mask with a substantially zigzag profile is embodied in the following Excel VBA code:

```
accumPosition = StartPoint
w = WalkNumPeriods / swidth
For i = 0 To swidth - 1
    accumPosition = accumPosition + TrendDir *
    (sheight * w) + (3# * Rnd - 1#)
    If(accumPosition >= sheight - 1) Then
        accumPosition = sheight - 0.8
        TrendDir = -1
    End If
    If (accumPosition <= 0) Then
        accumPosition = 0.5
        TrendDir = 1
    End If
    For j = 0 To accumPosition
        upperleftcell.Offset(j, i) = 1
    Next j
    For j = j To sheight - 1
        upperleftcell.Offset(j, i) = 0
    Next j
Next i
```

Figure 5:
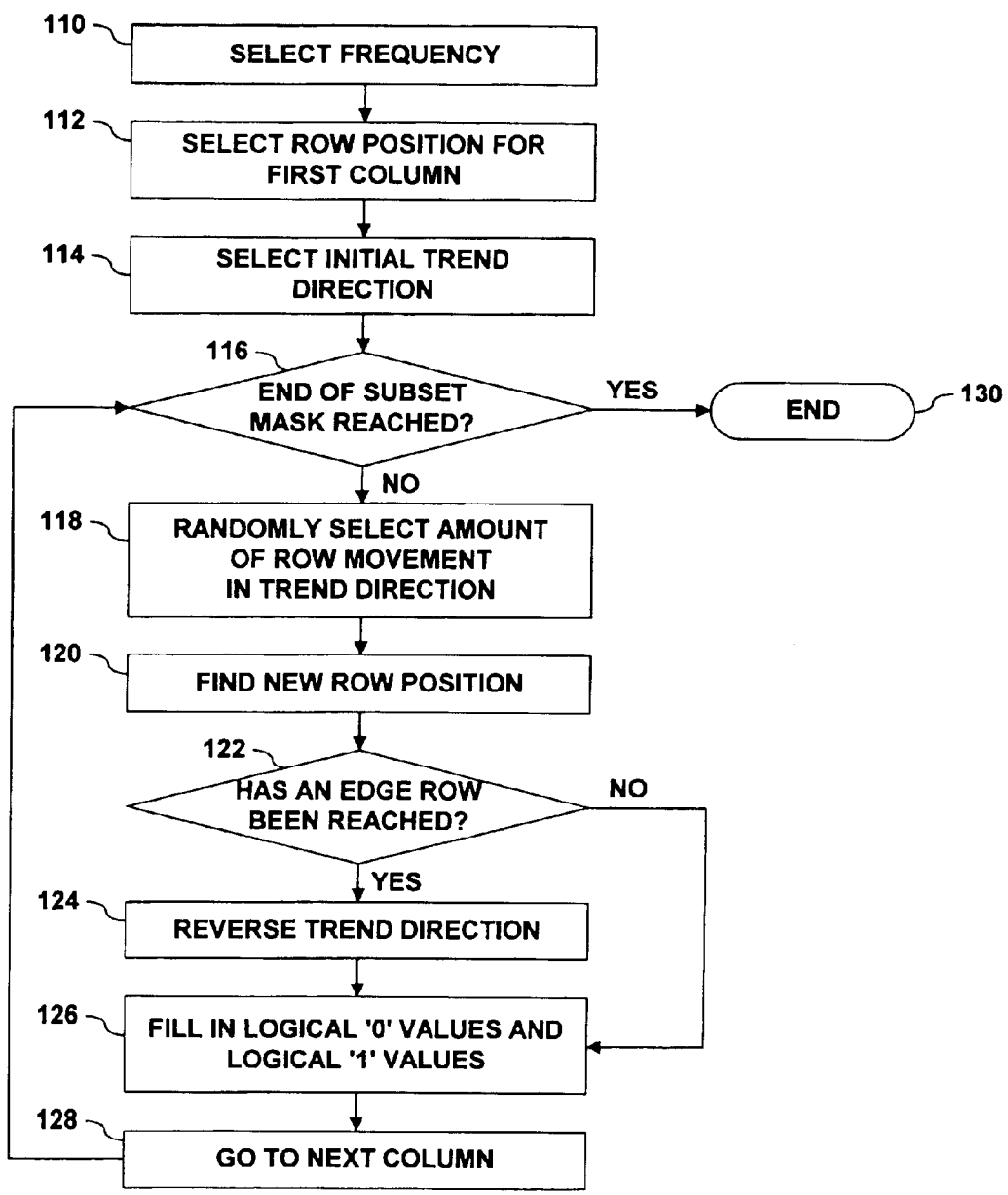
FIG. 5 is a flow diagram showing techniques for creation of a subset mask.

FIG. 5 is a flow diagram illustrating creation of a subset mask according to the above code. The frequency (w) for the subset mask is a selected parameter (110), and may be a function of the width of the swath in slow scan direction 28 (swidth) and the number of cycles in the subset mask (WalkNumPeriods). The phase may be chosen by selecting a starting boundary row position (accumPosition) in the first column (112). The row boundary is between the lowest row and the highest row (sheight-1). The boundary row positions for each column define the boundary between logical '1' values and logical '0' values. The trend direction, i.e., the direction that the boundary tends to move (TrendDir), may also be chosen (114). In a variation of this embodiment, some of these parameters may be randomly selected.

For each column in the subset mask (116), an amount of boundary row movement in the trend direction is randomly selected (118). The amount of boundary row movement in the trend direction may be positive or negative, but the random selection may be weighted to favor positive motion in the trend direction. The amount of motion may also be a function of the frequency. The new boundary row position is a function of the previous boundary row position and the boundary row movement (120). If the highest or lowest row of the subset mask has been reached (122), the trend direction is reversed (124).

The boundary between logical '0' values and logical '1' values depends upon whether a logical '0' value or a logical '1' value is entered at the boundary row position for a column. For all rows in the column above the boundary row position, a logical '1' value is entered. For all rows (upperleftcell.Offset) in the column below the boundary row position, a logical '0' value is entered (126). Thus, entry of a logical '0' value in the boundary row position causes the boundary to be between the boundary row and the row above it. Conversely, entry of a logical '1' value causes the boundary to be between the boundary row and the row below it. The next column is then considered (128), but if the end of the subset mask has been reached (116), the subset mask generation process ends (130).

The output of the process is a sequence of triangle-like clusters of logical '1' values and logical '0' values. The triangle-like clusters are formed from irregular, rather than consistently straight, lines. The result is a subset mask that resembles a zigzag with noise introduced to disrupt the regularity. Several subset masks may be generated in this way, and combined to generate a mask such as exemplary mask 70.

Figure 6:
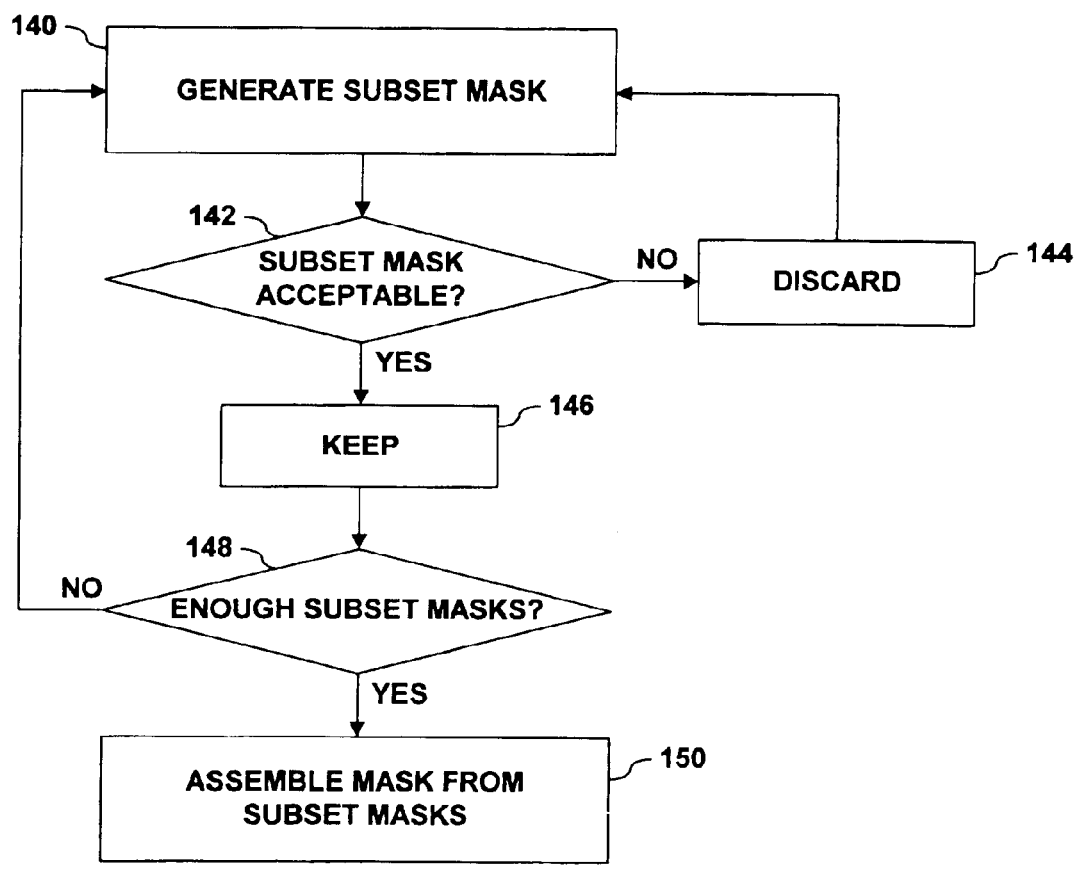
FIG. 6 is a flow diagram showing techniques for creation of a mask from subset masks.

FIG. 6 is a flow diagram that illustrates techniques for combining subset masks into a single mask. Each subset mask may be generated individually (140), as described above. Each subset mask is examined for acceptability (142), and if unacceptable, is discarded (144). A subset mask may be unacceptable when, for example, the mask is too regular. The introduction of random elements usually disrupts the regularity of the zigzag, but by chance, regularity may be present in the subset mask, and this regularity may manifest itself in an unintended pattern appearing in a printed image.

Another undesirable possibility is that the boundary between logical '1' values and logical '0' values fails to reach the highest or lowest row. In other words, the boundary resembles a meandering line rather than a zigzag. The swath boundary should ordinarily expand and contract, but if the boundary remains essentially constant, then unintended patterns may appear in a printed image.

When a subset mask is acceptable, it may be kept for later use (146), e.g., by storage in a computer-readable data file. In many cases, a mask like exemplary mask 70 is comprised of several subset masks. Several subset masks may be generated as needed (148).

When a series of acceptable subset masks have been generated, the subset masks may be assembled into a mask (150) and stored in a computer-readable data file. In general, the subset masks are assembled so as not to introduce patterns into the mask. The subset masks may include a variety of frequencies and phases, and may be arranged so that neighboring subset masks will not be too similar.

In addition, assembling a mask may include arranging subset masks for tiling in the fast and slow scan directions. In particular, in fast scan direction 28, each subset mask may be examined so that patterns will not be introduced when the mask is replicated by tiling. The mask may be "tweaked," such as by broadening or narrowing a triangle-like cluster, to disrupt any patterns generated by replication.

In general, therefore, a mask may be generated with a combination of mathematical and experimental techniques. Exemplary mask 70 is such a mask. Each subset mask in mask 70 was generated mathematically, but selection of subset masks for inclusion in mask 70 is a matter of experimentation. Subset masks were examined to determine whether the subset masks had the potential to introduce patterns, and subset masks that had the potential to introduce patterns were discarded. In addition, arranging the subset masks in mask 70 involved experimentation to disrupt patterns.

An experimentally created mask has several advantages over a mask that is generated purely mathematically. Although a mathematically generated mask may be created "on the fly" during the printing process, a mask generated with purely mathematical techniques may introduce unwanted patterns. In addition, generating a mask on the fly taxes the computing resources in laser controller 20. An experimentally created mask, by contrast, is static and pre-made, enabling retrieval of the mask or any subset of the mask when needed. Furthermore, an experimentally created mask can be thoroughly tested under controlled conditions, and will therefore hold fewer surprises during actual printing.

The invention may provide one or more advantages. For example, the invention offers simple techniques for reducing artifacts that may result from swath lines, while simultaneously reducing artifacts that may result from patterns in masks. In addition, expanding and contracting the swath takes advantage of the thermal benefits provided by adjacent lasers, thereby avoiding line narrowing.

A number of embodiments of the invention have been described. Nevertheless, various modifications may be made without departing from the scope of the invention. For example, the laser thermal imaging system described above is exemplary, and the techniques for reducing swath lines may be employed with other laser thermal imaging systems, such as systems that print on a flat plane instead of a drum. The invention may be used on laser thermal printers having any number of lasers. Moreover, mask 70 shown in FIG. 4 is not the only mask that may produce good results, and the invention is not limited to the particular mask shown.

Nor is the invention limited to masks or subset masks generated with the Excel VBA code provided above or the technique shown in FIG. 5. An equivalent zigzag boundary may be obtained by, for example, selecting columns in a subset mask for peaks and valleys, connecting the peaks to the valleys with straight lines, and adding noise to disrupt possible patterns. The frequency of the shapes may be regulated by controlling, for example, the length of the sides of the triangle-like clusters in the subset mask, or regulating the slope of the sides. Subset masks with equivalent zigzag boundaries may also be constructed using functions such as a sine or cosine, and adjusting the frequency of the function.

A larger mask tends to break up swath line patterns more pleasingly than a smaller mask, but the invention is not limited to masks of any particular size. The mask need not be in the form of a rectangular matrix, but be a set of logical values in any shape that can tile a plane, such as a triangle or rhombus. In addition, different masks may be created for different colors. Mask 70 may work well with cyan, for example, but a different mask may be used for magenta, which is printed at a different screen angle. These and other embodiments are within the scope of the following claims.

What is claimed is:

1. A mask for a laser thermal printer, the mask comprising:
   a first set of first logical values;
   a second set of first logical values; and
   a set of second logical values,
   wherein the first set of first logical values is spatially clustered in a first triangle-like shape and the second set of first logical values is spatially clustered in a second triangle-like shape, and
   wherein the spatial frequency of the first set of first logical values spatially clustered in the first triangle-like shape and the second set of first logical values spatially clustered in the second triangle-like shape is greater than the spatial frequency of neighboring halftone dots.

2. The mask of claim 1, wherein the first logical values are logical '0' values and the second logical values are logical '1' values.

3. The mask of claim 1, wherein the mask extends in a first direction, and wherein the first set of first logical values is spatially proximate to the second set of first logical values in the first directions.

4. The mask of claim 1, wherein the mask extends in a first direction and a second direction, wherein the first and second triangle-like shapes include a base and a peak, wherein the bases of the triangle-like shapes are oriented in the first direction, and wherein the base of the first triangle-like shape is spatially proximate to the peak of the second triangle-like shape in the second direction.

5. The mask of claim 4, wherein the peak are unaligned in the second direction.

6. The mask of claim 1, wherein the set of second logical values is spatially clustered in a third triangle-like shape.

7. The mask of claim 6, wherein the first and second triangle-like shapes have a first orientation and the third triangle-like shape has an orientation tat is inverted relative to the first orientation.

8. The mask of claim 1, wherein a boundary between the set of second logical values and the first and second sets of lint logical values is an irregular zigzag.

9. The mask of claim 1, wherein the first triangle-like shape is selected front a group consisting of a semicircular shape, a sinusoidal shape and a trapezoid shape and a pentagonal shape.

10. The mask of claim 1, wherein the mask is stored in a computer-readable data file.

11. A mask for a laser thermal printer comprising a first subset mask and a second subset mask,
    each subset mask comprising:
       a first set of first logical values;
       a second set of first logical values; and
       a set of second logical values,
       wherein the first set of first logical values in the first subset mask is spatially clustered in a first triangle-like shape and the second set of first logical values in the first subset mask is spatially clustered in a second triangle-like shape different from the first triangle-like shape.

12. The mask of claim 11, wherein the first logical values are logical '0' values arid the second logical values are logical '1' values.

13. The mask of claim 11, wherein the mask extends in a first direction and a second direction, wherein the first set of first logical values is spatially proximate to the second set of first logical values in the first subset mask in the first direction, and wherein the first subset mask is spatially proximate to the second subset mask in the second direction.

14. The mask of claim 11, wherein the set of second logical values in the first subset mask is spatially clustered in a third triangle-like shape.

15. A mask for a laser thermal printer, the mask comprising a first subset mask and a second subset mask, each subset mask comprising at least one set of first logical values and at least one set of second logical values, wherein the set of first logical values in the first subset mask has a first triangle-like shape and wherein the set of first logical values in the second subset mask has a second triangle-like shape, wherein the first triangle-like shape is different than the second triangle-like shape.

16. The mask of claim 15, wherein the mask extends in a first direction and a second direction, wherein each of the triangle-like shapes includes a base and a peak, wherein the bases of the triangle-like shapes are oriented in the first direction, and wherein the first subset mask is spatially proximate to the second subset mask in the second direction.

17. The mask of claim 16, wherein the peaks of the triangle-like shapes are unaligned in the second direction.

18. A method for printing with a laser thermal printing system, the method comprising:

printing a swath on a thermally sensitive medium as a function of a set of data; and varying the breadth of the swath during printing, wherein varying the breadth of the swath comprises irregularly contracting the breadth of the swath and irregularly expanding the breadth of the swath.

19. The mask of claim 18, wherein varying the breadth of the swath comprises contracting the breadth of the swath and expanding the breadth of the swatch.

20. The mask of claim 18, wherein varying the breadth of the swath comprises varying the breadth of the swath as a function of the set of data and a mask.

21. A method comprising:

generating a first set of first logical values in a first triangle-like shape;

generating a second set of first logical values in a second triangle-like shape different from the first triangle-like shape, and generating a mask for a laser thermal printer comprising a set of second logical values, the first set of first logical values in the first triangle-like shape and the second set of first logical values in the second triangle-like shape.

22. The mask of claim 21, wherein generating the first set of first logical values in the first triangle-like shape comprises:

defining a first column composing a second subset of contiguous first logical values;

wherein the second subset of contiguous first logical values is a function of the first subset, a trend direction and a spatial frequency.

23. The mask of claim 22, wherein the second subset of contiguous first logical values is further a function of a random element.

24. The mask of claim 22, wherein the spatial frequency of the first set of first logical values spatially clustered in the first triangle-like shape and the second set of first logical values spatially clustered in the second triangle-like shape is greater than the spatial frequency of neighboring halftone dots.

25. A method comprising:

generating a first subset mask comprising a first set of first logical values and a first set of second logical values;

generating a second subset mask different from the first subset mask comprising a second set of first logical values and a second set of second logical values; and assembling a mask for a laser thermal printer from the first subset mask and the second subset mask.

26. The mask of claim 25, wherein the first set of first logical values is spatially clustered in a first triangle-like shape and the second set of first logical values is spatially clustered in a second triangle-like shape.

27. The mask of claim 25, further comprising evaluating the first subset mask to determine whether printing on a laser thermal printing system as a function of the set of data and the first subset mask will create a pattern in a printed image.

28. The mask of claim 25, further comprising printing with a laser thermal printer as a function of image data and the first subset mask.

29. A system comprising:

a thermally sensitive color donor including colorant;

a receptor positioned to receive colorant from the donor;

a controller; and a set of lasers, each of the lasers receiving a signal from the controller and emitting a beam directed at the donor as a function of the signal, the beams forming a swath having a breadth, wherein the controller varies the breadth of the swath during printing by irregularly contracting the breadth of the swath and irregularly expanding the breadth of the swath.

30. The mask of claim 29, wherein the controller varies the breadth of the swath during printing as a function of a mask.

31. The mask of claim 30, wherein the mask comprising:

a first set of first logical values;

a second set of first logical values; and a set of second logical values, wherein the first set of first logical values is spatially clustered in a first triangle-like shape and the second set of first logical values is spatially clustered in a second triangle-like shape.

32. A mask for a laser thermal printer, the mask comprising:

a first set of first logical values;

a second set of first logical values; and a set of second logical values, wherein the first set of first logical values is spatially clustered in a first triangle-like shape and the second set of first logical values is spatially clustered in a second triangle-like shape and wherein a boundary between the set of second logical values and the first and second sets of first logical values is an irregular zigzag.

33. The mask of claim 32, wherein the first logical values are logical '0' values and the second logical values are logical '1' values.

34. The mask of claim 32, wherein the spatial frequency of the first set of first logical values spatially clustered in the first triangle-like shape and the second set of first logical values spatially clustered in the second triangle-like shape is greater than the spatial frequency of neighboring halftone dots.

35. A mask for a laser thermal printer, the mask comprising:

a first set of first logical values;

a second set of first logical values; and a set of second logical values, wherein the first set of first logical values is spatially clustered in a first triangle-like shape and the second set of first logical values is spatially clustered in a second triangle-like shape, wherein the first triangle-like shape is different than the second triangle-like shape, and wherein the first triangle-like shape is defined as a function of a random element.

36. The mask of claim 35, wherein the first logical values are logical '0' values and the second logical values are logical '1' values.

* * * * *

UNITED STATES PATENT AND TRADEMARK OFFICE
CERTIFICATE OF CORRECTION

PATENT NO. : 6,888,558 B2
DATED : May 3, 2005
INVENTOR(S) : Dallas K. Peirson

It is certified that error appears in the above-identified patent and that said Letters Patent is hereby corrected as shown below:

Column 13,
Lines 9 and 13, replace "The mask of claim 18" with -- The method of claim 18 --.
Line 27, replace "The mask of claim 21" with -- The method of claim 21 --.
Line 30, replace "composing" with -- comprising --.
Lines 36 and 39, replace "The mask of claim 22" with -- The method of claim 22 --.
Lines 54, 59 and 63, replace "The mask of claim 25" with -- The method of claim 25 --.

Column 14,
Line 14, replace "The mask of claim 29" with -- The system of claim 29 --.
Line 17, replace "The mask of claim 30" with -- The system of claim 30 --.

Signed and Sealed this

First Day of November, 2005

JON W. DUDAS
*Director of the United States Patent and Trademark Office*